Patented Feb. 16, 1937

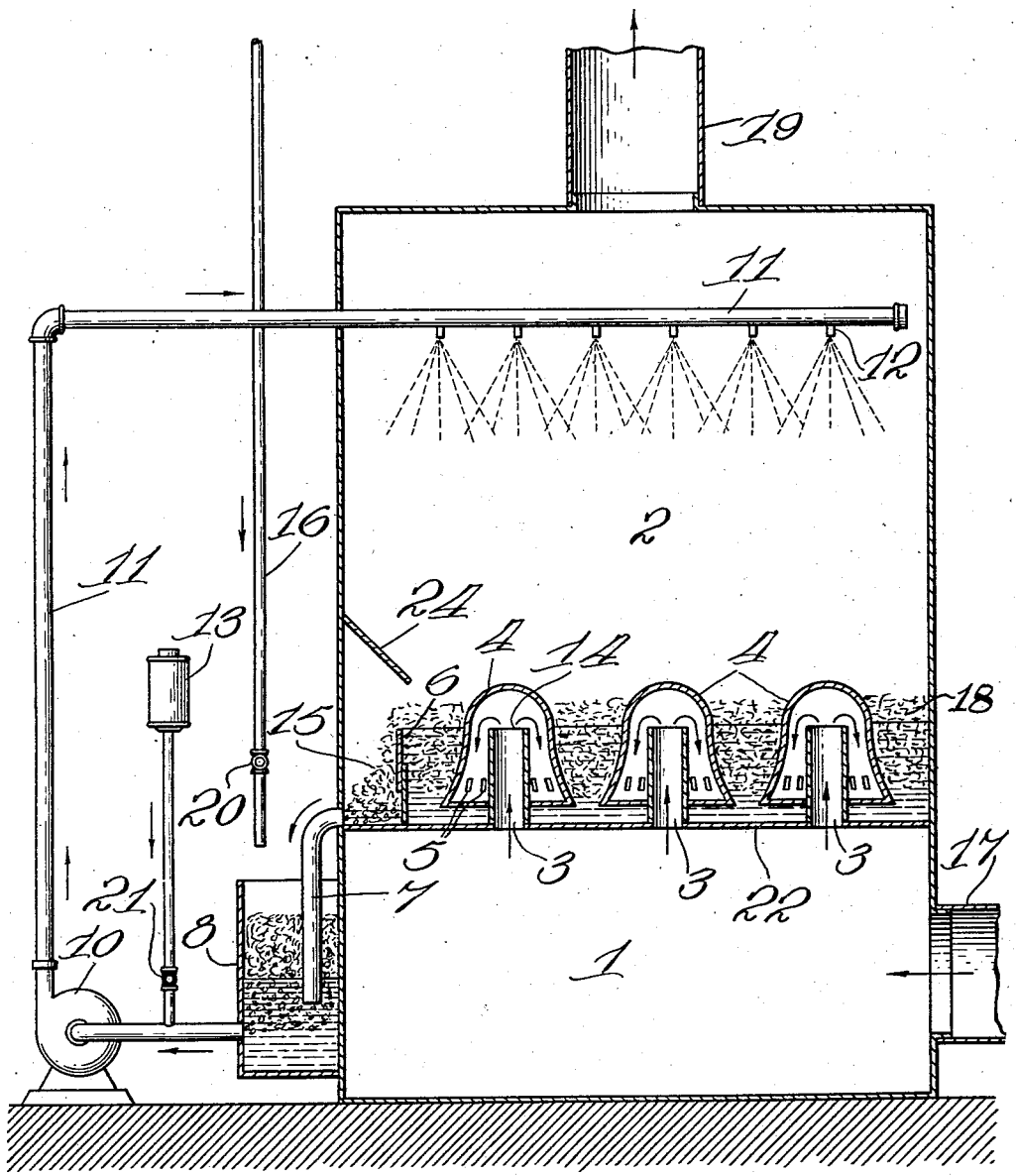

2,070,578

UNITED STATES PATENT OFFICE 2,070,578

APPARATUS AND METHOD FOR REMOVING PARTICLES FROM GASES

Reginald G. Bowman, Gary, Ind., assignor to The Traughber Engineering Co., a corporation of Ohio Application October 7, 1933, Serial No. 692,659

4 Claims. (Cl. 261—121)

This invention relates to an improved apparatus and method for removing particles from gases.

In my co-pending application Serial No. 612,375 which issued as Patent 1,959,945 on May 22, 1934, is set forth a method of treating gases to remove dust and other particles therefrom, which consists essentially in the preparation of an emulsion or froth consisting of oil and a washing liquid such as water, upon the surface of the washing liquid, and contacting the gases with such froth or foam.

The present invention relates to an apparatus particularly designed for use with such process, and to an improvement upon the process.

The apparatus is illustrated diagrammatically in the drawing, the figure representing a side elevation in broken section of a gas treating apparatus. This consists of an entrance chamber 1 and a treatment chamber 2, separated by a horizontal partition 22, in which are openings 3 communicating with the tubes or thimbles 14. These tubes are open at the top and are covered with the inverted cups or bubble caps 4, near the lower edge of which are perforations 5. A dam or baffle 6 is provided to maintain a liquid level on the partition 22, the height of the dam being not greater than the top of the tubes 14. Between the dam 6 and the wall of the chamber 2 is a space 15 drained by the pipe 7, which communicates with the compartment 8. Near the top of the chamber 2 is a pipe 11 provided with spray nozzles 12. Material is supplied to these spray nozzles by the centrifugal pump 10, which picks up oil from the oil feeding device 13 controlled by the valve 21 and water from the compartment 8. Water may be supplied to the compartment 8 through the pipe 16 controlled by the valve 20. The compartment 8 communicates with the pump 10 through the pipe 9.

In carrying out the operation of the device water or other washing liquid is conducted onto the partition 22 up to the level of the dam 6. The compartment 8 is also filled with washing liquid. The pump 10 is then started and the valve 21 controlling the oil feed opened, so that an oil-washing liquid emulsion is projected through the spray nozzles 12 onto the washing liquid in the chamber 2. A baffle 24 may be provided to prevent the spray from falling directly into the space 15. The emulsion forms a foam 18 on the surface of the washing liquid. Gases are then admitted to the chamber 1 though the conduit 17 and pass through the openings 3 into the cups 4 and bubble out through the openings 5, through the froth layer 18, and are then removed through the conduit 19, securing an additional washing during their passage through the spray from the nozzles 12, which are continously in operation.

The spent foam overflows the dam 6 and runs out through the pipe 7 into the compartment 8 in which the liquid separates and is recycled through the pipe 9 and pump 10. Makeup water may be made up from the line 16 as desired and dirty froth may be removed from the compartment 8 as desired.

It is not essential in the operation to produce a froth by spraying mixed oil and water. On the contrary, oil may be scattered upon the surface of the water and will be formed into a froth or foam by the bubbling action of the gas.

The chambers of the device are preferably of steel although other suitable materials may be used. The washing liquid is preferably water, and the oil may be any suitable substantially insoluble and immiscible emulsifying oil such as lubricating oil. Commercial frothing agents may be added where desirable in order to produce a suitable foam or froth.

The foregoing detailed description has been given for clearness of understanding only, and no unnecessary limitations should be understood therefrom, but the appended claims should be construed as broadly as permissible, in view of the prior art.

What I claim as new, and desire to secure by Letters Patent, is:

1. In an apparatus for removal of fine particles from gases, a gas line, a compartment connected therewith, a second compartment above the first, vapor risers between the compartments extending a substantial distance between the second compartment, overflow means for maintaining a substantial body of washing liquid about the vapor risers, bell means adapted to force gases substantially below the liquid level and to divide the gases into fine streams, an outlet for overflow liquid, means for spraying the washed gases with an emulsion of washing liquid and a frothing material, and means for collecting and removing washed gases.

2. Apparatus as set forth in claim 1, in which a chamber connecting with the overflow by a liquid sealed connection is provided, adapted to permit the separation of washing liquid from froth, and means connecting the said chamber are provided for recycling the separated washing liquid.

3. The method of washing gases to remove fine particles therefrom which comprises passing gases through a body of washing liquid, having on the surface thereof a froth of oil-washing liquid emulsion, removing spent froth continuously from the surface of the liquid, separating washing liquid from the removed froth, adding oil to the separated washing liquid and recycling the separated liquid to the washing liquid body by spraying it into the path of the washed gases.

4. In an apparatus for the removal of fine particles from gases, a chamber provided with an overflow adapted to maintain therein a body of washing liquid, means for supplying a frothing agent and washing liquid to the chamber, means for feeding gases below the surface of the washing liquid, said gas supplying means being adapted to break up the gases into small bubbles, whereby froth is produced near the surface of the liquid, and the overflow being adapted to permit the froth formed to flow continuously from the liquid, while maintaining a substantial layer of froth thereon, means for separating washing liquid from the overflow froth, means for supplying make-up frothing material to the separated washing liquid, and means for recycling the washing liquid to the system.

REGINALD G. BOWMAN.